Patented July 17, 1923.

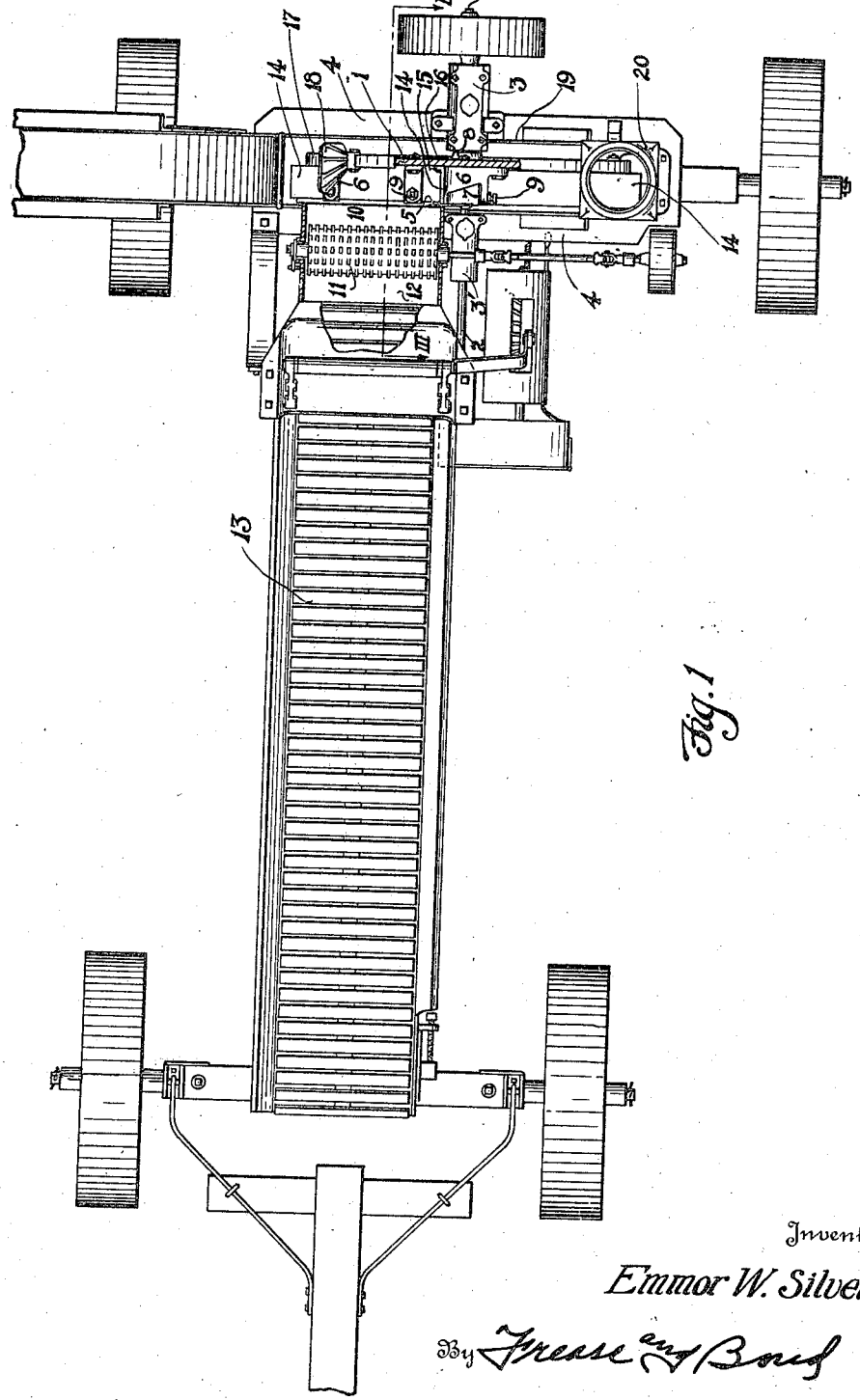

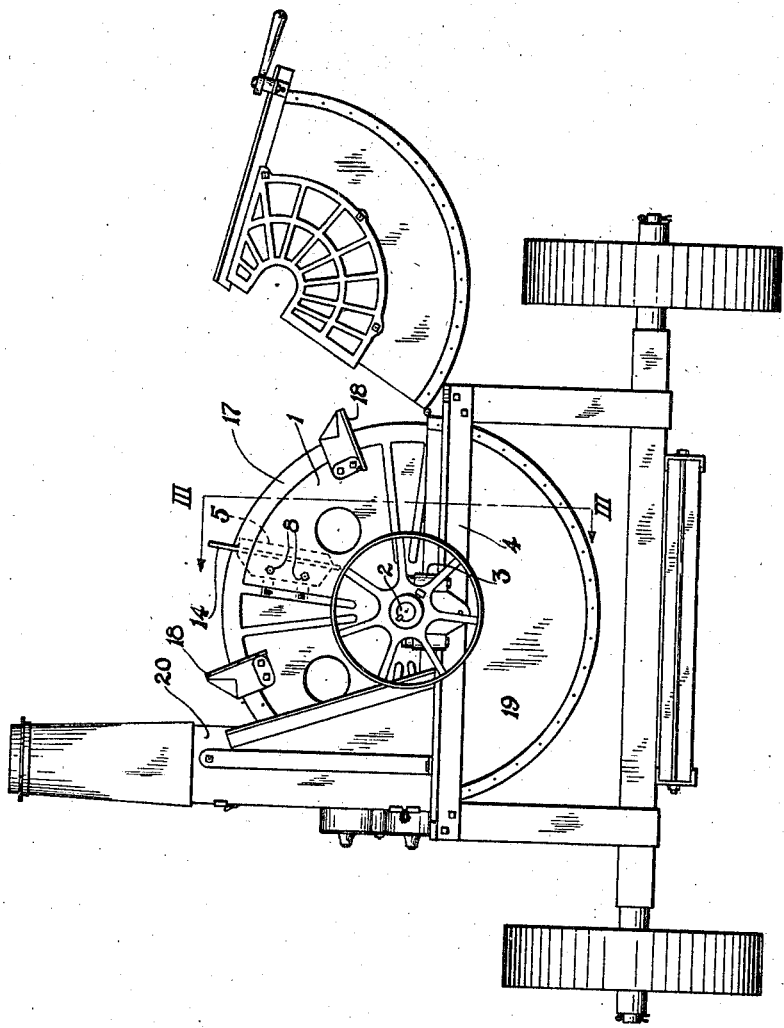

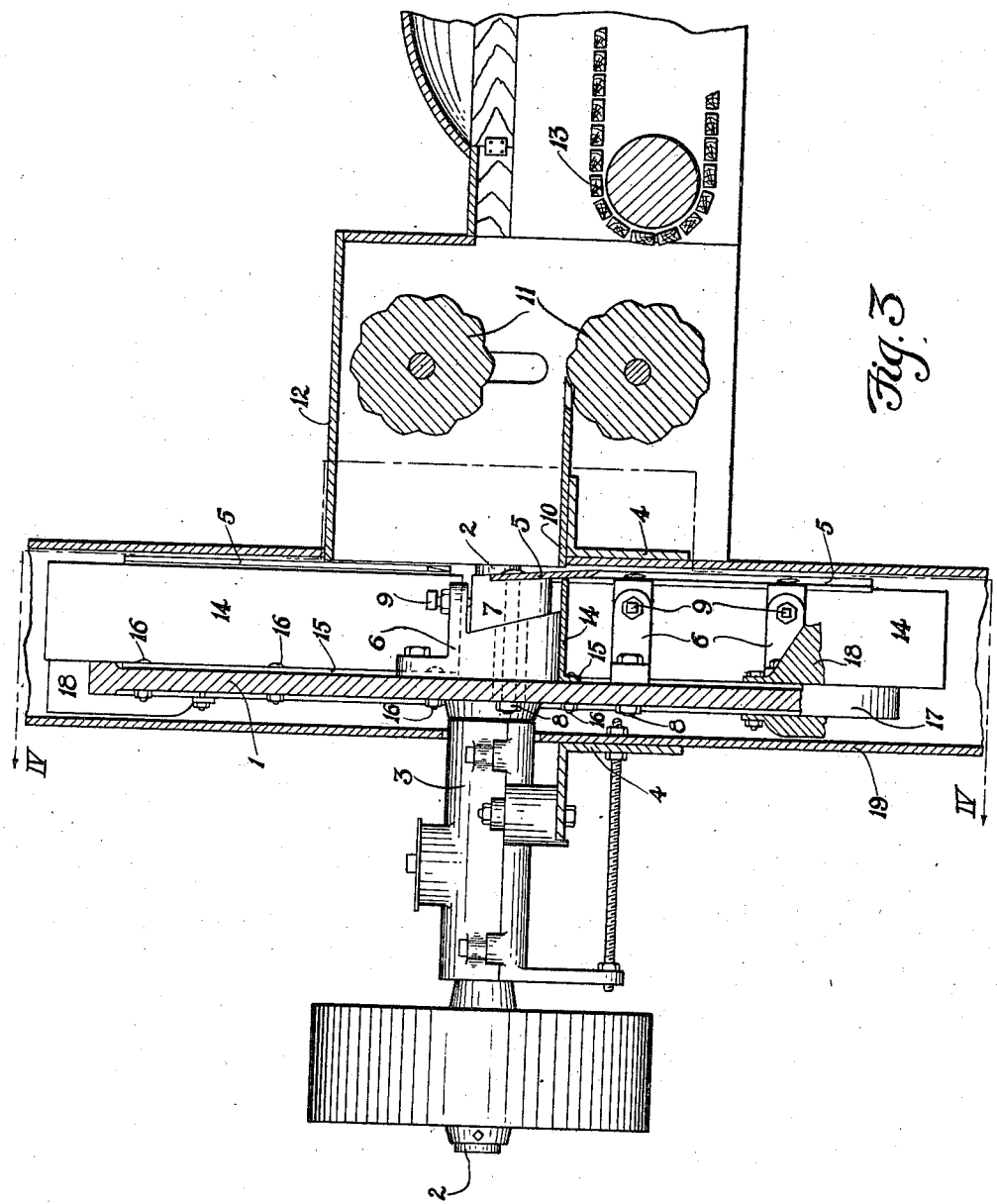

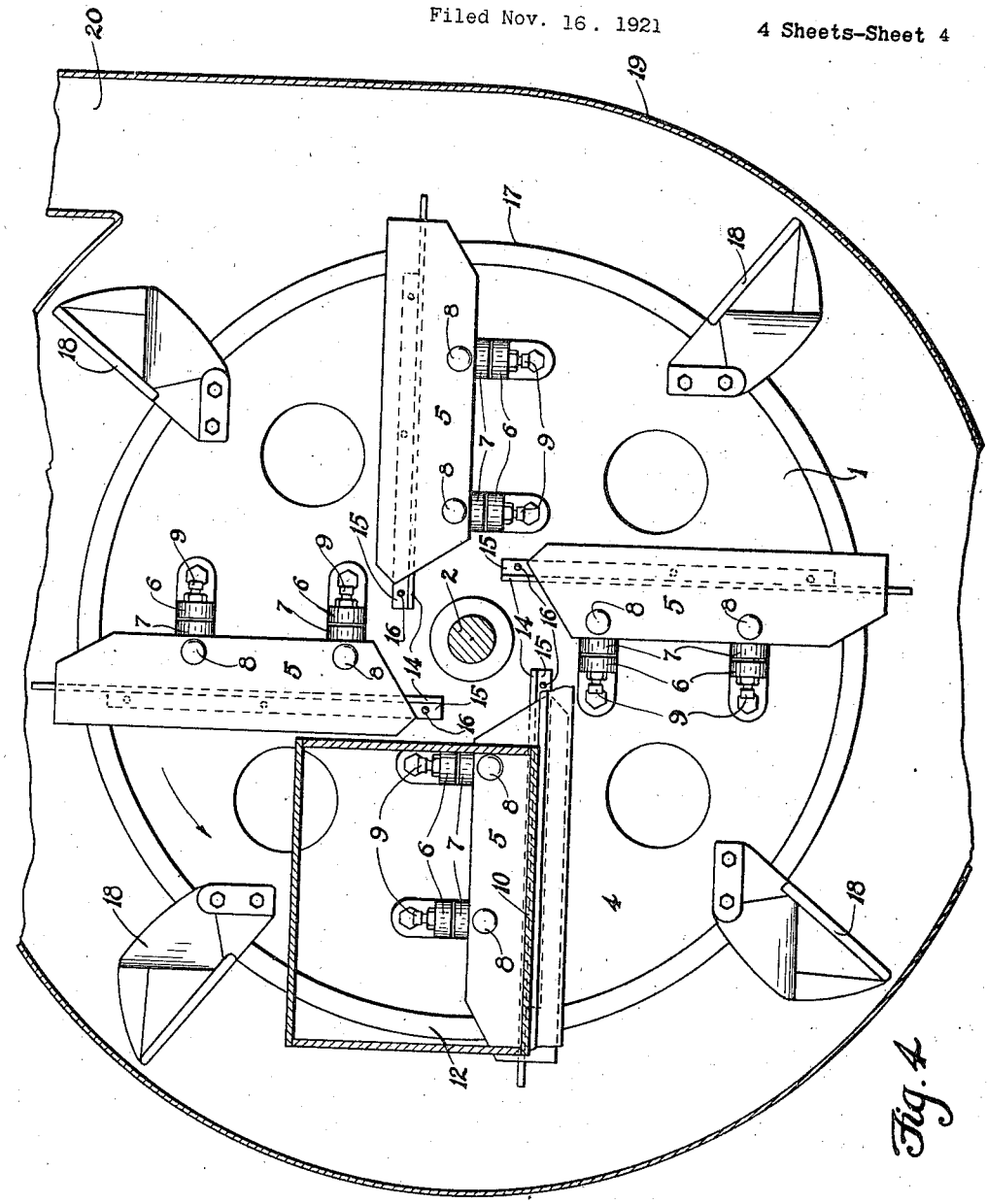

1,461,764

UNITED STATES PATENT OFFICE.

EMMOR W. SILVER, OF SALEM, OHIO, ASSIGNOR TO THE SILVER MANUFACTURING COMPANY, OF SALEM, OHIO, A CORPORATION.

ENSILAGE CUTTER.

Application filed November 16, 1921. Serial No. 515,486.

*To all whom it may concern:*

Be it known that I, EMMOR W. SILVER, a citizen of the United States, residing at Salem, in the county of Columbiana and State of Ohio, have invented certain new and useful Improvements in Ensilage Cutters, of which the following is a specification.

The improvement relates to machines for cutting feed, fodder, ensilage and the like, in which the cutting blades are mounted upon the side of a substantially solid disk fly wheel; and the object of the improvement is to provide means for preventing the cut material from clogging between the cutting blades and the fly wheel, and also for preventing strings and fibrous materials from winding around the hub of the fly wheel or the shaft upon which it is mounted.

In machines of this kind the cutting blades are usually mounted upon the forward side of the fly wheel by a pair of spaced posts, blocks or standards which may be provided with adjusting means, and which form obstructions around which the cut material may lodge and clog the space between the blade and disk and finally interfere with the proper cutting action of the blades.

The present improvement involves the use of deflecting plates or vanes between the cutting blades and the fly wheel at a substantial distance in rear of the cutting edge of the blades; and these plates or vanes may and preferably do extend outward beyond the periphery of the fly wheel, so as to perform the functions of a like number of the ordinary flights mounted thereon.

A preferred embodiment of the invention is illustrated in the accompanying drawings forming part hereof, in which—

Figure 1 is a plan view of an ensilage cutter, with the top of the blower case opened and a portion of the fly wheel broken away to show details of construction;

Fig. 2, a rear end view of the machine showing the top of the blower case opened;

Fig. 3, is a side elevation section on line III—III, Figs. 1 and 2, but showing the top of the blower case closed; and Fig. 4, a transverse section on line IV—IV Fig. 3.

Similar numerals refer to similar parts throughout the several figures of the drawings.

The fly wheel 1 is mounted on a main driving shaft 2 operating in bearings 3 and 3' mounted upon the frame 4 of the machine; and the cutting blades 5 are carried at a spaced interval from the forward face of the fly wheel upon posts 6 secured to the side of the wheel, which posts preferably include wedge blocks 7 which may be adjusted by bolts 8 and 9 to properly position the blades.

The cutting blades co-operate with a cutter bar or plate 10 transversely mounted on the frame of the machine, over which cutter bar ensilage or other material is fed by feed rolls 11 through a throat 12 which receives the material from the rear end of a conveyor 13 in well known manner.

At the forward side of the standards 6, as the fly wheel rotates, and at a substantial distance in rear of the edge of each cutting blade 5 is secured a plate or vane 14, which fills the entire space between the cutting blade and fly wheel and serves to deflect outward the cuttings as fast as they are severed from the material by the blades.

The cutting blades are preferably mounted upon the fly wheel so that their outer ends are inclined at a retreating angle from their inner ends, so as to give a proper shearing action with the cutter bar; and the deflecting plates or vanes 14 are likewise inclined at a retreating angle, so as to increase their centrifugal action into deflecting and discharging the cuttings outward.

The plates or vanes 14 may be secured to the side of the fly wheel by means of flanges 15 and bolts or rivets 16, and preferably extend outward beyond the periphery 17 of the fly wheel so as to co-operate with the flights 18 mounted thereon in creating the air current within the blower casing 19 which carries the cuttings to and discharges it through the elevator pipe 20 leading to a silo or other place of storage.

In the operation of the machine, the deflecting plates or vanes catch the cuttings as they are severed by the blades, and throw them by centrifugal action into the peripheral portion of the blower case, whence they are discharged in the usual manner, and it has been found that the deflecting plates, positioned as described prevents any lodging or clogging of the cuttings between the cutting plates and the fly wheel.

I claim:—

1. An ensilage cutter or the like including a wheel, a cutting blade on the side face of the wheel at an interval therefrom and an outwardly flanged deflecting plate secured to the wheel and directly between the blade and the wheel in rear of the cutting edge of the blade.

2. An ensilage cutter or the like including a wheel, a cutting blade on the side face of the wheel at an interval therefrom, and a deflecting plate directly between the blade and the wheel and in line with the blade and extending beyond the periphery of the wheel.

3. An ensilage cutter or the like including a cutter bar, an adjacent fly wheel, a cutting blade on the side face of the wheel at an interval therefrom, and a deflecting plate secured to said wheel and between the blade and the wheel and in line with the blade and extending beyond the same.

EMMOR W. SILVER.